United States Patent
Lewinski Komincz et al.

(10) Patent No.: US 10,644,598 B1
(45) Date of Patent: May 5, 2020

(54) SWITCHING CONVERTER WITH OUTPUT INDUCTOR ESTIMATOR CIRCUIT

(71) Applicant: TEXAS INSTRUMENTS INCORPORATED, Dallas, TX (US)

(72) Inventors: Artur Juliusz Lewinski Komincz, Dallas, TX (US); Abdelhalim Alsharqawi, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/368,370

(22) Filed: Mar. 28, 2019

(51) Int. Cl.
  *H02M 3/158* (2006.01)
  *H02M 1/08* (2006.01)
  *H02M 3/157* (2006.01)
  *H02M 1/00* (2006.01)

(52) U.S. Cl.
  CPC ............. *H02M 3/158* (2013.01); *H02M 1/08* (2013.01); *H02M 3/157* (2013.01); *H02M 2001/0025* (2013.01)

(58) Field of Classification Search
  CPC ...... H02M 3/156; H02M 3/157; H02M 3/158; H02M 1/08; H02M 2001/0025
  See application file for complete search history.

(56) References Cited

U.S. PATENT DOCUMENTS

| 6,952,093 | B1 | 10/2005 | Broach et al. |
| 7,759,912 | B2 | 7/2010 | Went et al. |
| 2010/0027301 | A1* | 2/2010 | Hoyerby ............. H02M 3/1563 363/39 |
| 2010/0131219 | A1* | 5/2010 | Kenly ................ G01R 19/0092 702/64 |

* cited by examiner

*Primary Examiner* — Adolf D Berhane
(74) *Attorney, Agent, or Firm* — Michael A. Davis, Jr.; Charles A. Brill; Frank D. Cimino

(57) ABSTRACT

An automotive system includes a battery and a switching converter circuit. The switching converter circuit includes an output inductor estimator circuit coupled to a driver and a switch node of the switching converter circuit. The output inductor estimator circuit is configured to estimate inductance for an output inductor based on a comparison of sampled voltages from the switch node with voltage error values obtained using an adjustable estimated inductance parameter. The output inductor estimator circuit is configured to provide a signal indicating the estimated inductance for the output inductor.

21 Claims, 8 Drawing Sheets

SWITCHING CONVERTER WITH OUTPUT INDUCTOR ESTIMATOR CIRCUIT

BACKGROUND

Switching converters are electronic circuits with switches that are capable of a converting an input voltage (Vin) into an output voltage (Vout) with a small loss of power. An example DC-DC switching converter includes an output inductor, an output capacitor, a power stage (with power transistors) and a controller. In operation, the inductor and capacitor filter out the switching signal provided by the power stage. Meanwhile, the controller monitors Vout and provides waveforms to the power stage to maintain regulation on Vout. In many cases, to ensure a stable regulation, the controller can only work with a certain range of output inductors and output capacitors.

Depending on the output power, the power transistors may or may not be placed together with the controller in a single integrated circuit. Also, the output inductor and output capacitor are usually discrete external components due to their size. For cost and flexibility reasons, efforts to provide a controller that can address a wide range of inductors and capacitors. To that end, several techniques are available. In one example technique, the current on the output inductor is measured and is used to adjust a controller or feedback loop. This type of topology is typically referred as a "current mode" converter. The disadvantage of this technique is that the overall gain loop may be reduced by placing this second loop in the system. Another disadvantage is that minimum turn on time or minimum turn off time is not optimal as it is limited by the switching characteristics to resolve to a reliable current reading. In another technique, a user can manually adjust the compensation of the controller. In another technique, a range of output inductors and output capacitors that are compatible with a given controller are identified and provided to a customer. Efforts to improve controller flexibility are ongoing.

SUMMARY

In accordance with at least one example of the disclosure, an automotive system comprises a battery. The automotive system also comprises a switching converter circuit with an input supply voltage node, a high-side switch, a low-side switch, a switch node between the high-side switch and the low-side switch, a driver for the high-side switch and the low-side switch, wherein the input node of the switching converter circuit is coupled to the battery. The system also comprises an output inductor with a first end and a second end, wherein the first end of the output inductor is coupled to the switch node of the switching converter circuit. The system also comprises an output capacitor with a first terminal and a second terminal, wherein the first terminal of the output capacitor is coupled to the second end of the output inductor, and wherein the second terminal of the output capacitor is coupled to a ground node. The system also comprises a load coupled to the second end of the output inductor. The switching converter circuit also comprises an output inductor estimator circuit coupled to the driver and the switch node. The output inductor estimator circuit is configured to estimate inductance for the output inductor based on a comparison of sampled voltages from the switch node with voltage error values obtained using an adjustable estimated inductance parameter. The output inductor estimator circuit is configured to provide a signal indicating the estimated inductance for the output inductor.

In accordance with at least one example of the disclosure, a switching converter device comprises a switch set having at least one switch and a switch node. The switching converter device also comprises a switch set having at least one switch and a switch node. The switching converter device also includes a driver coupled to the at least one switch. The switching converter device also comprises an output inductor estimator circuit coupled to the driver and the switch node. The output inductor estimator circuit is configured to estimate inductance of an output inductor associated with the converter device based on a comparison of sampled voltages from the switch node with voltage error values obtained using an adjustable estimated inductance parameter. The output inductor estimator circuit is configured to provide a signal indicating the estimated inductance for the output inductor.

In accordance with at least one example of the disclosure, an inductor estimator circuit comprises a sampling circuit coupled to a switch node for a switching converter. The inductor estimator circuit also comprises a comparator with a voltage error input node and a sampled voltage ramp input node, wherein the sampled voltage ramp input node is coupled to an output node of the sampling circuit. The inductor estimator circuit also comprises a current source coupled to the voltage error input node. The inductor estimator circuit also comprises a multiplier coupled to the current source. The inductor estimator circuit also comprises digital logic with an input node coupled to an output node of the comparator and with an output node coupled to an input node of the multiplier.

In accordance with at least one example of the disclosure, an inductor estimator circuit comprises a first circuit configured to sample voltage at a switch node for a switching converter. The inductor estimator circuit also comprises a second circuit coupled to the first circuit, wherein the second circuit is configured to compare voltage error values with sampled voltage values provided by the sample circuit. The inductor estimator circuit also comprises a third circuit coupled to the second circuit and configured to use iterative outputs of the second circuit to determine an estimated inductance for an output inductor associated with the switching converter.

BRIEF DESCRIPTION OF THE DRAWINGS

For a detailed description of various examples, reference will now be made to the accompanying drawings in which.

DETAILED DESCRIPTION

Figure 1:
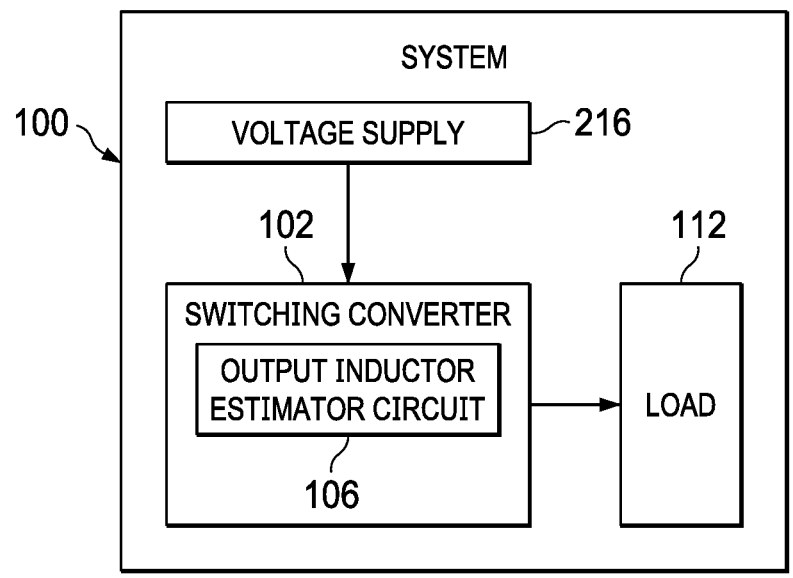
FIG. 1 is a block diagram showing a system in accordance with various examples.

Disclosed herein are switching converter devices, systems, and methods involving an output inductor estimator circuit. Example switching converter devices include alternating-current to direct-current (AC-DC) converter devices and DC-DC converter devices. In some examples, the output inductance estimated by the output inductor estimator circuit is used to trigger a fault light or message ("output inductor too big", "output inductor too small", "modification needed: use an output inductor with a range between A and B"). As another option, the output inductance estimated by the output inductor estimator circuit triggers an enable signal or disable signal for a switching converter device. As another option, the output inductance estimated by the output inductor estimator circuit is used to adjust an input to (a feedback signal) or a parameter of a control circuit (e.g., a voltage feedback control loop and/or compensation circuit) for a switching converter device. In either case, the adjustment causes the control circuit to adjust how one or more switches of a switching converter device are directed.

In some examples, the output inductor estimator circuit estimates an output inductance of a switching converter circuit during start-up of the switching converter circuit (before the output voltage of the switching converter circuit reaches a steady-state regulation level). In other examples, the output inductor estimator circuit estimates the output inductance of a switching converter circuit during a steady-state regulation interval (after the output voltage of the switching converter circuit reaches a steady-state regulation level). In both examples, the normal voltage regulation operation of the switching converter circuit is not disrupted. Also, the output inductor estimator circuit does not modify other start-up or steady-state switching converter operations related to providing an output voltage based on an input voltage. In other words, the inductance estimation occurs on-line with the switching converter in normal operation.

In some examples, a switching converter circuit is a voltage mode DC-DC converter with adaptive compensation based on the output inductance estimated by the output inductor estimator circuit. In other examples, the switching converter circuit is an AC-DC or DC-DC converter with a fault detection interface triggered by the output inductance estimated by the output inductor estimator circuit. In some examples, the fault detection interface initiates one or more fault responses (e.g., an LED light, a sound, a message, and/or a disable signal) in response to the output inductance estimated by the output inductor estimator circuit being outside a predetermined range for a given controller or switching converter circuit.

In one example, a system comprises a voltage supply circuit and an output capacitor. The system also comprises an output inductor having a first end and a second end, where the second end is coupled to a first terminal of the output capacitor, and where a second terminal of the output capacitor is coupled to a ground node. The system also comprises a switching converter circuit coupled to the voltage supply circuit and to the output inductor, where the switching converter circuit comprises an output inductor estimator circuit.

In a voltage mode converter scenario, an example voltage mode converter circuit includes a switch set with at least one switch and a switch node, where the switch node is coupled to the second end of the output inductor. The voltage mode converter circuit also comprises a voltage feedback control loop coupled to the compensation circuit (part of the controller) to control the at least one switch. The voltage mode converter circuit also comprises an output inductor estimator circuit coupled to the switch set and to the voltage feedback control loop. The output inductor estimator circuit comprises a comparator with a voltage error input node and a voltage ramp input node. The output inductor estimator circuit also comprises digital logic with an input node coupled to an output node of the comparator. The output node of the digital logic is coupled to the at least one component of the voltage feedback control loop With the disclosed output inductor estimator circuit and related estimated inductance response options, the sensitivity of a voltage mode converter topology to external components is reduced. For example, instead of being limited to a tight range of input voltage level and external components (e.g., output inductor and output capacitance) and/or instead of using programmable external components, a disclosed voltage mode converter topology is compatible with a wide range of external components preserving its transient response and stability. The disclosed output inductor estimator circuit also enables switching converters to avoid a separate compensation pin and additional external components used to manage external component compatibility. The disclosed output inductor estimator circuit also enables switching converters to notify a designer or user when the value of an output inductor is outside a predetermined range. Another example use of the estimated inductance provided by an output inductor estimator circuit is to enable or disable a switching converter based on the estimated inductance.

In one example scenario, a switching converter with an output inductor estimator circuit is part of an automotive system with a battery that provides an input supply voltage of 5V-40V. The switching converter receives the input supply voltage directly from the battery or from conditioning components (e.g., filters and/or regulators). The switching converter operates as a buck converter to provide an output supply voltage that is less than the input supply voltage. Example output supply voltages include 5V, 3.3V, 1.8V, or 1.2V. As desired, multiple switching converters are used in an automotive system to power different loads with different input voltage requirements. Example loads for an automotive system include, but are not limited to, microprocessors, sensors, actuators, displays, an infotainment interface, and an intelligent power module (IPM). Without the output inductor estimator circuit, a switching converter with an extra pin would be needed to enable compensation adjustments based on an output inductance. Without the output inductor estimator circuit, avoiding faulty output inductors and/or incompatible output inductors is more difficult. Use of faulty or incompatible output inductors may result in output voltage oscillations, which could damage load components. Alternatively, the switching converter may shut down, which would disable certain parts of the automotive system. To provide a better understanding, various switching converter device, system, and method options involving an output inductor estimator circuit are described using the figures as follows.

FIG. 1 is a block diagram showing a system 100 in accordance with various examples. The system 100 represents a consumer device or other electronic device with integrated circuits and/or discrete components. As shown, the system 100 comprises a switching converter circuit 102 coupled to a voltage supply circuit 108 and a load 112, where the switching converter circuit 102 is configured to provide an output voltage to power the load 112 based on input voltage from the voltage supply circuit 108. In some examples, the switching converter circuit 102 is a DC-DC converter (e.g., a voltage mode DC-DC converter or a current DC-DC converter). In other examples, the switching converter circuit 102 is an AC-DC converter.

As shown in FIG. 1, the switching converter circuit 102 includes an output inductor estimator circuit 106. In some examples, the switching converter circuit 102 includes a switch set having at least one switch (e.g., M1 and M3, FIG. 2) and a switch node (e.g., switch node 218, FIG. 2). In a voltage mode converter scenario, the switching converter circuit 102 also includes a voltage feedback control loop (e.g., the voltage feedback control loop 220 in FIG. 2) coupled to the switch set. In some examples, the output inductor estimator circuit 106 is part of an adaptive compensation circuit coupled to the switch node. In some examples, the output inductor estimator circuit 106 comprises a current sink (e.g., the current sink 408, FIG. 4) and a comparator (e.g., the comparator 414, FIG. 4) with a first input node coupled to the current sink and with a second input node coupled to an inductor current ripple reading circuit (e.g., components 416 and 418, FIG. 4). In some examples, the output inductor estimator circuit 106 also includes digital logic (412, FIG. 4) with an input node coupled to an output node of the comparator, where an output node of the digital logic is coupled to the voltage feedback control loop.

One example use of the estimated inductance provided by the output inductor estimator circuit 106 is to reduce the sensitivity of a voltage mode DC-DC converter to external components. Thus, instead of being limited to a tight range of input voltage levels and external components (e.g., output inductor and output capacitor) and/or instead of using programmable external components, a voltage mode DC-DC converter is compatible with a wide range of external components. Another example use of the estimated inductance provided by the output inductor estimator circuit 106 is to avoid a separate compensation pin and additional external components used to manage external component compatibility. Another example use of the estimated inductance provided by the output inductor estimator circuit 106 is to notify a designer or user when the value of an output inductor is outside a predetermined range.

In some examples, the system 100 is an automotive system. In such case, the voltage supply circuit 216 represents a battery, or a battery and conditioning components (e.g., regulators and/or filters). The switching converter 102 receives an input voltage supply (e.g., 5V-40V) from the voltage supply circuit 216, and provides an output voltage supply (e.g., 5V, 3.3V, 1.8V, or 1.2 V) to a load 112, input supply voltage of 5V-40V. The switching converter receives the input supply voltage directly from the battery or from conditioning components (e.g., filters and/or regulators). The switching converter operates as a buck converter to provide an output supply voltage that is less than the input supply voltage. Example output supply voltages include 5V, 3.3V, 1.8V, or 1.2 V. As desired, multiple switching converters are used in an automotive system to power different loads with different input voltage requirements. Example loads for an automotive system include, but are not limited to, microprocessors, sensors, actuators, displays, an infotainment interface, and an intelligent power module (IPM). Without the output inductor estimator circuit, a switching converter with an extra pin would be needed to enable compensation adjustments based on an output inductance. Without the output inductor estimator circuit, avoiding faulty output inductors and/or incompatible output inductors is more difficult. Use of faulty or incompatible output inductors may result in output voltage oscillations, which could damage load components. Alternatively, the switching converter may shut down, which would disable certain parts of the automotive system.

Figure 2:
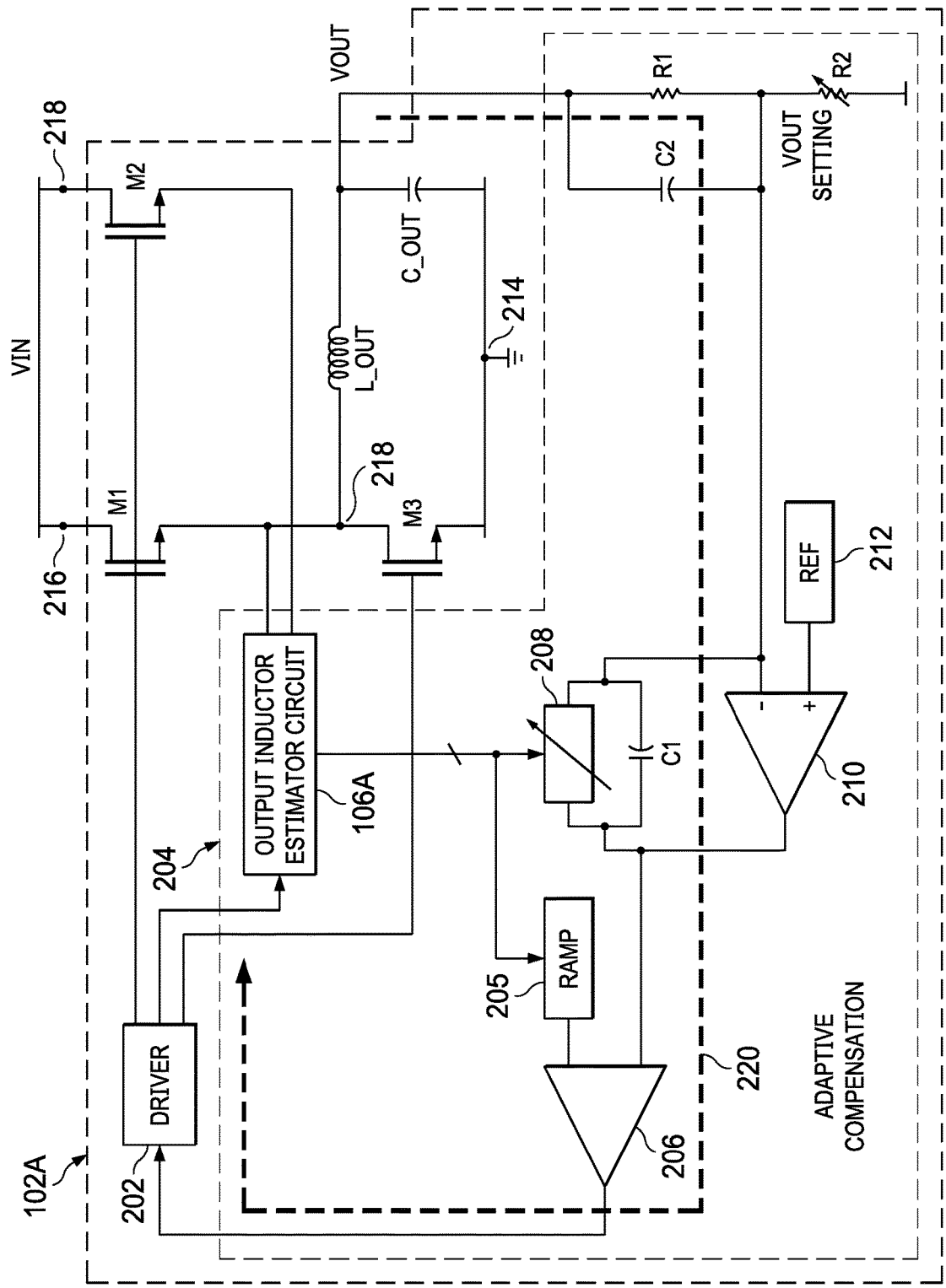
FIG. 2 is a schematic diagram showing a voltage mode DC-DC (direct-current to direct-current) converter with high-side sensing for an output inductor estimator circuit in accordance with various examples.

FIG. 2 is a schematic diagram showing a voltage mode DC-DC converter 102A (an example of the switching converter circuit 102 in FIG. 1) with high-side sensing for an output inductor estimator circuit 106A in accordance with various examples. In different examples, the voltage mode DC-DC converter 102A corresponds to an integrated circuit, a multi-die module, or a printed circuit board (PCB) with a combination of integrated circuit and/or discrete components. The output inductor estimator circuit can be used to adjust the compensation circuit, forming a self-adaptive compensation. In FIG. 2, the voltage mode DC-DC converter 102A includes an adaptive compensation circuit 204 coupled to the switch node 218 of a switch set with two transistors, M1 and M3. For adaptive compensation based on high-side sensing, the adaptive compensation circuit 204 is coupled to an input supply voltage (VIN) via another switch (M2). In some examples, M2 is a replica of M1 scaled down by a ratio of n. In some examples, VIN is provided by a voltage supply circuit such as the voltage supply circuit 108 in FIG. 1.

In FIG. 2, the voltage mode DC-DC converter 102A includes an output inductor (L_OUT) and an output capacitor (C_OUT), where a first end of L_OUT is coupled to the switch node 218 and a second end of L_OUT is coupled to the top plate of C_OUT. The bottom plate of C_OUT is coupled to a ground node 214. As shown, the voltage at the top plate of C_OUT is the output voltage (VOUT) for the voltage mode DC-DC converter 102A, where VOUT is available to provide power a load (not shown). In different examples of the voltage mode DC-DC converter 102A, L_OUT and C_OUT are discrete components while the other components represented are part of an integrated circuit. In such examples, the integrated circuit is compatible with a wide range of L_OUT values, which distinguishes the voltage mode DC-DC converter 102A from other voltage mode DC-DC converter topologies.

In FIG. 2, the adaptive compensation circuit 204 includes an output inductor estimator circuit 106A (an example of the output inductor estimator circuit 106 in FIG. 1). With adaptive compensation based on an estimated inductance determined by the output inductor estimator circuit 106A, the sensitivity of the voltage mode DC-DC converter 102A to variations in L_OUT is reduced. Thus, instead of being limited to a tight range of L_OUT values and/or instead of using programmable external components, the voltage mode DC-DC converter 102A is compatible with a wide range of L_OUT values. The voltage mode DC-DC converter 102A also avoids a separate compensation pin and additional external components used to manage external component compatibility. Without limitation to other examples, C_OUT for the voltage mode DC-DC converter 102A may be on the order of tens of micro Farads. Meanwhile, L_OUT for the voltage mode DC-DC converter 102A may be on the order of 0.5 micro Henrys to tens of micro Henrys.

In the voltage mode DC-DC converter 102A, VOUT is provided to a voltage feedback control loop 220 of the adaptive compensation circuit 204, where the voltage feedback control loop 220 is configured to regulate VOUT by adjusting the control signals for M1 and M3. More specifically, in the example of FIG. 2, the voltage mode DC-DC converter 102A represents a buck converter scenario, where the control terminal of M1 is coupled to a driver 202, the first current terminal of M1 is coupled to a voltage supply node 216 (to provide VIN), and the second current terminal of M1 is coupled to the switch node 218. Meanwhile, the control terminal of M3 is coupled to the driver 202, the first current terminal of M3 is coupled to the switch node 218, and the second current terminal of M3 is coupled to the ground node 214. Thus, VOUT is regulated by controlling when M1 and M3 are turned on or off.

In the example of FIG. 2, the output inductor estimator circuit 106A of the adaptive compensation circuit 204 provides an inductance estimate that is used to adjust a variable resistor 208 and/or a ramp circuit 205 of the adaptive compensation circuit 204. In other examples, the estimated inductance determined by an output inductor estimator circuit, such as the output inductor estimator circuit 106A, is used in a low-side sensing buck converter scenario (see e.g., FIG. 3), a high-side sensing boost converter scenario, or a low-side sensing boost converter scenario. If a switching converter tends to use high-duty cycles (a low Vin to Vout ratio, where M1 turns on for more time than M2), then the high-side sensing arrangement of FIG. 2 is favored for use by an output inductor estimator circuit over a low-side sensing arrangement (see e.g., FIG. 3). On the other hand, if a switching converter tends to use low duty cycles (high Vin to Vout ratio, where M5 turns on more time than M4), then the low-side sensing arrangement of FIG. 3 is favored for use by an output inductor estimator circuit over the high-side sensing arrangement of FIG. 2.

In the example of FIG. 2, the voltage feedback control loop 220 includes a voltage divider (formed by R1 and R2) coupled between the second end of L_OUT (the top plate of C_OUT) and a ground node, where R1 is fixed and R2 is adjustable. By selecting the values for R1 and R2, a reduced output voltage level (VOUT SETTING) is obtained at the node between R1 and R2. In the example of FIG. 2, a capacitor (C2) is in parallel with R1, and VOUT SETTING is provided to an operational amplifier 210. The operational amplifier 210 also receives a reference voltage from a reference voltage source 212.

In the example of FIG. 2, the output of the operational amplifier 210 is provided as an input to a comparator 206. Also, negative feedback for the operational amplifier 210 is based on C1 and variable resistor 208. More specifically, in some examples, the variable resistor 208 is adjusted based on the inductance estimate determined by the output inductor estimator circuit 106A. The other input to the comparator 206 is provided by the ramp circuit 205, which provides a ramp waveform. In some examples, the ramp waveform provided by the ramp circuit 205 can be adjusted based on an output inductance estimate determined by the output inductor estimator circuit 106A. The output of the comparator 206 is based on the difference between the ramp waveform and a voltage error signal. In the example of FIG. 2, the voltage error signal is provided by the operational amplifier 210, where the negative feedback path for the operational amplifier 210 includes C1 and the variable resistor 208 in parallel. In some examples, the output inductor estimator circuit 106A is configured to adjust the voltage error signal by adjusting the variable resistor 208 based on the estimated inductance determined by the output inductor estimator circuit 106A. The output of the comparator 206 is provided to the driver 202, which generates gate drive signals for M1-M3. In some examples, as in the example of FIG. 2, the output of the driver 202 is also received by the output inductor estimator circuit 106A.

Figure 3:
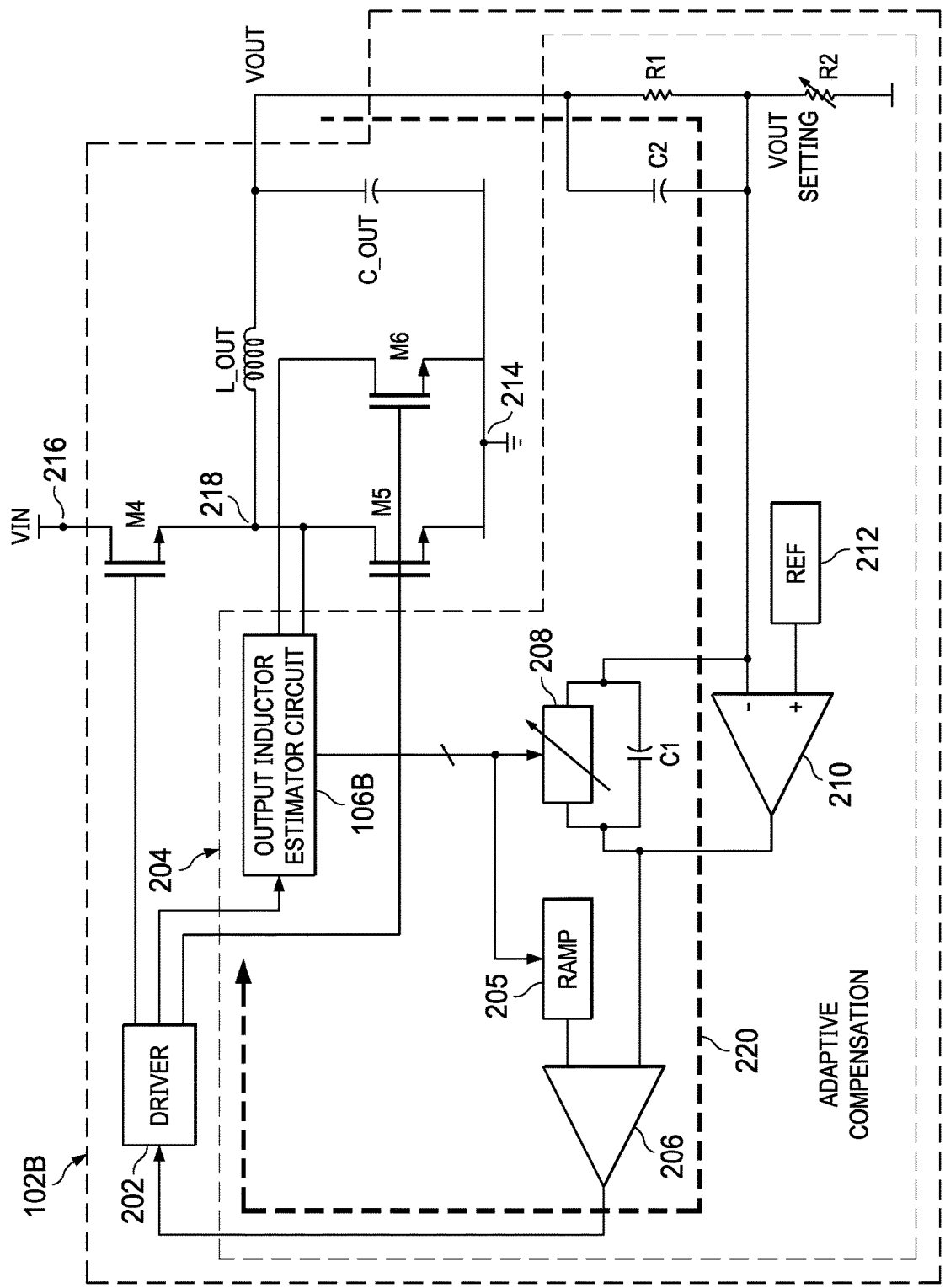
FIG. 3 is a schematic diagram showing a voltage mode DC-DC converter with low-side sensing for an output inductor estimator circuit in accordance with various examples.

FIG. 3 is a schematic diagram showing a voltage mode DC-DC converter 102B with low-side sensing for an output inductor estimator circuit 106B in accordance with various examples. In different examples, the voltage mode DC-DC converter 102B corresponds to an integrated circuit, a multi-die module, or a PCB with a combination of integrated circuit and/or discrete components. In FIG. 3, the voltage mode DC-DC converter 102G includes many of the same components introduced for the voltage mode DC-DC converter 102A of FIG. 2. As shown, the voltage mode DC-DC converter 102B includes an output inductor estimator circuit 106B (an example of the output inductor estimator circuit 106 in FIG. 1) coupled to the switch node 218 of a switch set with two transistors, M4 and M5. For adaptive compensation based on low-side sensing, the adaptive compensation circuit 104B is coupled to the ground node 214 via another switch (M6). In some examples, M6 is a scaled replica of M5.

In FIG. 3, the voltage mode DC-DC converter 102B (an example of a buck converter) includes L_OUT and C_OUT, where the first end of L_OUT is coupled to the switch node 218 and a second end of L_OUT is coupled to the top plate of C_OUT. The bottom plate of C_OUT is coupled to the ground node 214. As shown, the voltage at the top plate of C_OUT is the output voltage (VOUT) for the voltage mode DC-DC converter 102G, where VOUT is available to provide power a load (not shown). In different examples of the voltage mode DC-DC converter 102G, L_OUT and C_OUT are discrete components while the other components represented are part of an integrated circuit. In such examples, the integrated circuit is compatible with a wide range of L_OUT values, which removes the disadvantages of the voltage mode DC-DC converter 102G or other topologies from being specifically designed for a narrow range of L_OUT.

One use of the estimated inductance provided by the output inductor estimator circuit 106G is to decrease the sensitivity of the voltage mode DC-DC converter 102G to variations in components such as L_OUT. Thus, instead of being limited to a tight range of L_OUT and/or instead of using programmable external components, the voltage mode DC-DC converter 102B is compatible with a wide range of L_OUT. In some examples, L_OUT may vary between 0.5 pH to 10 pH. The voltage mode DC-DC converter 102B also avoids a separate compensation pin and additional external components used to manage external component compatibility.

In the voltage mode DC-DC converter 102B, VOUT is provided to a voltage feedback control loop 220 of the adaptive compensation circuit 204. The voltage feedback control loop 220 is configured to regulate VOUT by adjusting the control signals for M4 and M5. More specifically, in the example of FIG. 3, the voltage mode DC-DC converter 102B represents a buck converter scenario, where the control terminal of M4 is coupled to the driver 202, the first current terminal of M4 is coupled to the voltage supply node 216 (to provide VIN), and the second current terminal of M4 is coupled to the switch node 218. Meanwhile, the control terminal of M5 is coupled to the driver 202, the first current terminal of M5 is coupled to the switch node 218, and the second current terminal of M5 is coupled to the ground node 214. Thus, VOUT is regulated by controlling when M4 and M5 are turned on or off. In the example of FIG. 3, the output inductor estimator circuit 106B determines an output inductance estimate, which is used to adjust the voltage feedback control loop 220. In other examples, the output inductor estimator circuit 106B is used in a high-side sensing buck converter scenario (see e.g., FIG. 2), a high-side sensing boost converter scenario, or a low-side sensing boost converter scenario.

In the example of FIG. 3, the voltage feedback control loop 220 includes the same components described in FIG. 2. Again, R1 and R2 form a voltage divider between the second end of L_OUT (the top plate of C_OUT) and a ground node, where R1 is fixed and R2 is adjustable. The voltage divider results in VOUT SETTING (a reduced output voltage level) at the node between R1 and R2. As shown, C2 is in parallel with R1, and VOUT SETTING is provided to the operational amplifier 210, which also receives a reference voltage from the reference voltage source 212.

Again, the output of the operational amplifier 210 is provided as an input to the comparator 206. Also, negative feedback for the operational amplifier 210 is based on C1 and the variable resistor 208. More specifically, in some examples, the variable resistor 208 is adjusted based on an inductance estimate determined by the output inductor estimator circuit 106B. The other input to the comparator 206 is a ramp waveform provided by the ramp circuit 205. In some examples, the ramp waveform provided by the ramp circuit 205 is adjusted based on an output inductor estimate determined by the output inductor estimator circuit 1066.

The output of the comparator 206 is based on the difference between the ramp waveform and a voltage error signal. In the example of FIG. 3, the voltage error signal is provided by the operational amplifier 210, where a negative feedback path for the operational amplifier 210 includes C1 and the variable resistor 208 in parallel. In some examples, the adaptive compensation circuit 104B is configured to adjust the voltage error signal based on the estimated inductance of L_OUT provided by the output inductor estimator circuit 1066. As shown, the output of the comparator 206 is provided to the driver 202, which generates gate drive signals for M4-M6. In some examples, as in the example of FIG. 3, the output of the driver 202 is also received by the output inductor estimator circuit 106B.

Figure 4:
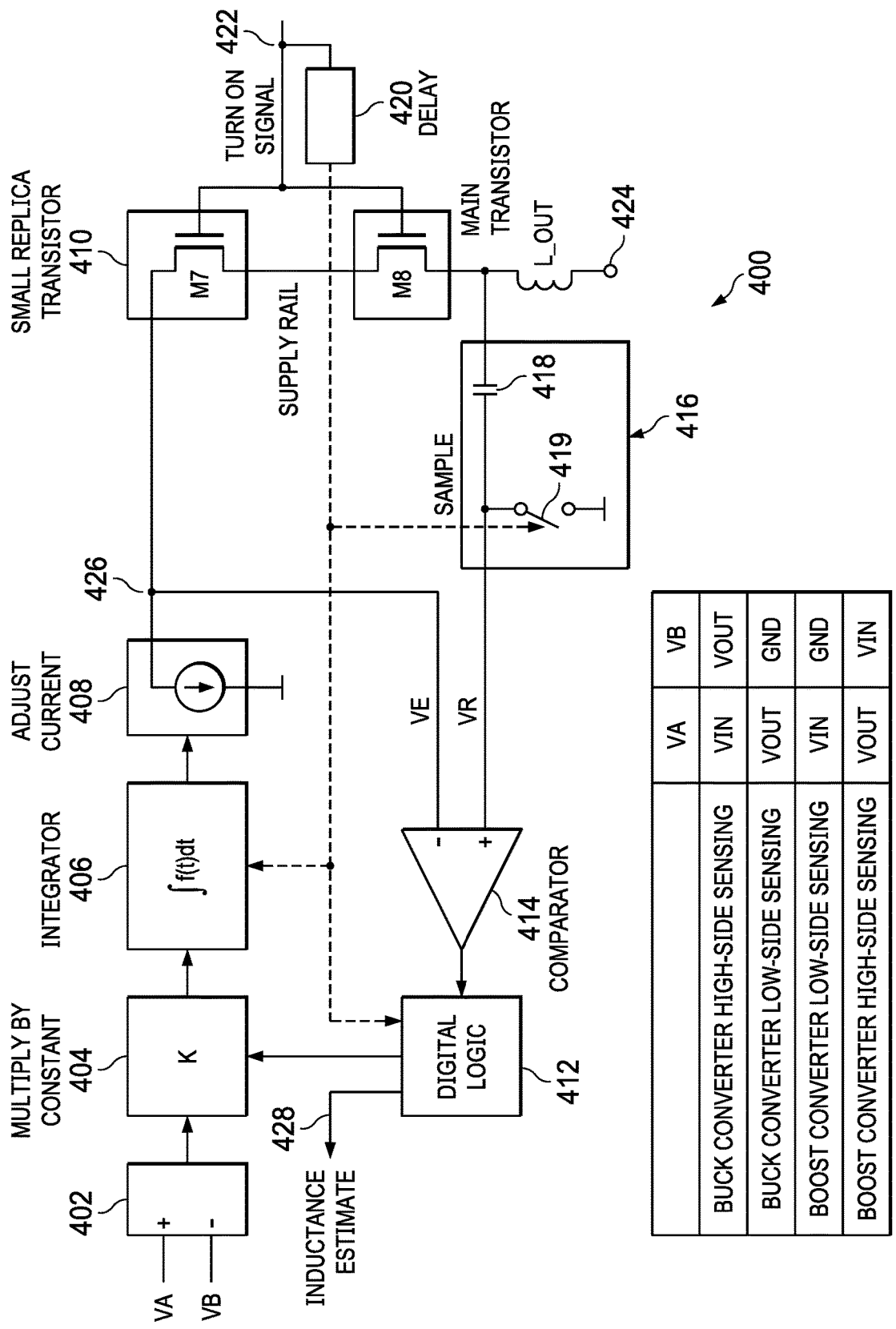
FIG. 4 is a schematic diagram showing an output inductor estimator circuit in accordance with various examples.

FIG. 4 is a schematic diagram showing an output inductor estimator circuit 400 in accordance with various examples. The output inductor estimator circuit 400 in FIG. 4 is an example of the output inductor estimator circuit 106 in FIG. 1, the output inductor estimator circuit 106A in FIG. 2, or the output inductor estimator circuit 106B in FIG. 3. In operation, the output inductor estimator circuit 400 provides an inductance estimate or related signal to node 428 (e.g., coupled to the ramp circuit 205 of FIG. 2, the variable resistor 208 of FIG. 2, an enable/disable component, and/or an alert components), where the inductance estimate or related signal is used to adjust a constant (K) for a multiplication circuit 404.

In the example of FIG. 4, the value of K used by the multiplication circuit 404 is applied to a value (VA−VB) received from a subtraction circuit 402, such that the output of the multiplication circuit is K*(VA−VB). As shown in FIG. 4, in a buck converter high-side sensing scenario, the value VA−VB is VIN−VOUT. In a buck converter low-side sensing scenario, the value VA−VB is VOUT−GND. In a boost converter low-side sensing scenario, the value VA−VB is VIN−GND. In a boost converter high-side sensing scenario, the value VA−VB is VOUT−VIN. In FIG. 4, the output of the multiplication circuit 404 is provided to an integrator 406 to integrate K*(VA−VB), where the timing of integration is triggered by the delay circuit 420. The purpose of the delay is to ensure that M7 or M8 are fully on before obtaining the inductance estimate. In other examples, a control voltage supervisor logic can be used to ensure that M7 or M8 are fully on. The output of the integrator 406 (the integration of K*(VA−VB) started by a signal determined by the delay circuit 420) is used to control a current source 408, where the output (Ve=Irer·∫K*(VA−VB)) of the current source 408 is provided to a node 426. In FIG. 4, the node 426 provides a voltage error (VE) to a comparator 414, where VE in FIG. 4 is a ramp that varies as a function of the current source 408 and the resistance of M7, and where M7 is controlled by a turn on signal provided by node 422. In some examples, M7 is a scaled replica of M8. As shown, the control terminal of M7 is coupled to the node 422, the first current terminal of M7 is coupled to the node 426, and the second current terminal of M7 is coupled to the first current terminal of M8. Also, the control terminal of M8 is coupled to the node 422, and the second current terminal of M8 is coupled to the first end of L_OUT. Thus, when M7 and M8 are turned on, the VE ramp at the node 426 is a guess of how a sampled voltage ramp (VR) at a first end of L_OUT would behave.

In operation, the output inductor estimator circuit 400 is configured to estimate the inductance of L_OUT by comparing how a sampled voltage ramp at the first end of L_OUT, where the sampled voltage ramp corresponds to the ripple current in the inductor starting at the time determined by delay circuit 420. The delay provided by the delay circuit 420 ensures that M7 and M8 are fully on. As shown in FIG. 4, the first end of L_OUT is provided to a sampling circuit 416, where the switch 419 for the sampling circuit 416 is coupled to and directed by the delay circuit 420. In some examples, the sampling circuit 416 also includes a capacitor 418 that stores charge, where the amount of charge stored by the capacitor 418 over time is a function of the voltage at the first side of L_OUT and the operation of the switch 419. In the example of FIG. 4, when the switch 419 is closed, VR is grounded. Meanwhile, when the switch 419 is open, VR tracks the voltage at the first side of L_OUT, where L_OUT is between a second current terminal of M8 and node 424 in the example of FIG. 4. To summarize, VR is representative of the current at M8, with the initial value removed such that it starts from zero.

As shown in FIG. 4, VR is provided to the comparator 414, which compares VE and VR. The output of the comparator 414 is provided to digital logic 412, which can use multiple values of the comparator output to determine an estimated inductance or related signal, which is output to node 428 (e.g., the node 428 is coupled to the ramp circuit 205 of FIG. 2, the variable resistor 208 of FIG. 2, an enable/disable switching converter component, and/or an alert component). The digital logic 412 also adjusts K up or down, where adjustments to K result in different VE ramps for comparison with VR. To summarize, the output inductor estimator circuit 400 is configured to sample and compare VR with a guessed value (VE). As the number of VE guesses increases, VR can be determined with be within a given range for VE. In different examples, the amount guesses, the adjustment strategy for VE, and/or the accuracy desired for the estimated inductance may vary. Without limitation to other examples, 3-5 adjustments of VE is believed to be a reasonable strategy to determine a range for VR to within a desired accuracy.

In some examples, the output inductor estimator circuit 400 performs the process of obtaining and comparing VR and VE iteratively until the difference between VR and VE is less a threshold and/or the difference does not change by more than a threshold amount (indicating that the value of K results in a slope for VE that is close to the slope for VR).

Once the comparison of VR and VE results in a "match" to within a threshold accuracy, the inductance estimation process may stop and the final inductance value is passed to an adaptive compensation circuit, or to another circuit to determine if the inductance is within a desired range. In other examples, the inductance estimation process can keep iterating or resume at a later stage.

With the output inductor estimator circuit 400, the sensitivity of a switching converter (e.g., the voltage mode DC-DC converter 102A in FIG. 2, or the voltage mode DC-DC converter 102B in FIG. 3) to variations in components such as L_OUT is reduced by compensating for L_OUT based on the estimated inductance determined by the output inductor estimator circuit 400. Thus, instead of being limited to a tight range of L_OUT and/or instead of using programmable external components, a switching converter operates to estimate L_OUT and compensate for a wide range of L_OUT values. The estimated inductance determined by the output inductor estimator circuit 400 may additionally or alternatively be used to enable/disable a switching converter when L_OUT is estimated to have a value outside of a desired range. The estimated inductance determined by the output inductor estimator circuit 400 may additionally or alternatively be used to provide an alert when L_OUT is estimated to have a value outside of a desired range. Example alerts include providing a sound, a light, and/or a message to a user or designer.

In some examples, the output inductor estimator circuit 400 is configured to use low-side sensing (see e.g., FIG. 3) or high-side sending (see e.g., FIG. 2) to determine if an estimated inductance of an output inductor (e.g., L_OUT) is above a target inductance and to decrease the estimated inductance of the output inductor in response to the estimated inductance of the output inductor being above the target inductance. Also, the output inductor estimator circuit 400 is configured to use low-side sensing or high-side sensing to determine if an estimated inductance of an output inductor (e.g., L_OUT) is below a target inductance and to increase the estimated inductance of the output inductor in response to the estimated inductance of the output inductor (e.g., L_OUT) being below the target inductance. In the example of FIG. 4, the output inductor estimator circuit 400 performs an integration to estimate inductance. In some examples, the output inductor estimator circuit 400 estimates inductance of an output inductor (e.g., L_OUT in FIGS. 2 and 3) during a start-up interval for a switching converter. Additionally or alternatively, the output inductor estimator circuit 400 estimates inductance of an output inductor (e.g., L_OUT in FIGS. 2 and 3) during a steady-state regulation interval for a switching converter. The estimated inductance may be used to adjust feedback loop compensation for a switching converter, to enable or disable a switching converter, to provide an indication to a user or designer that L_OUT is outside of a desired range, and/or other uses.

Figure 5:
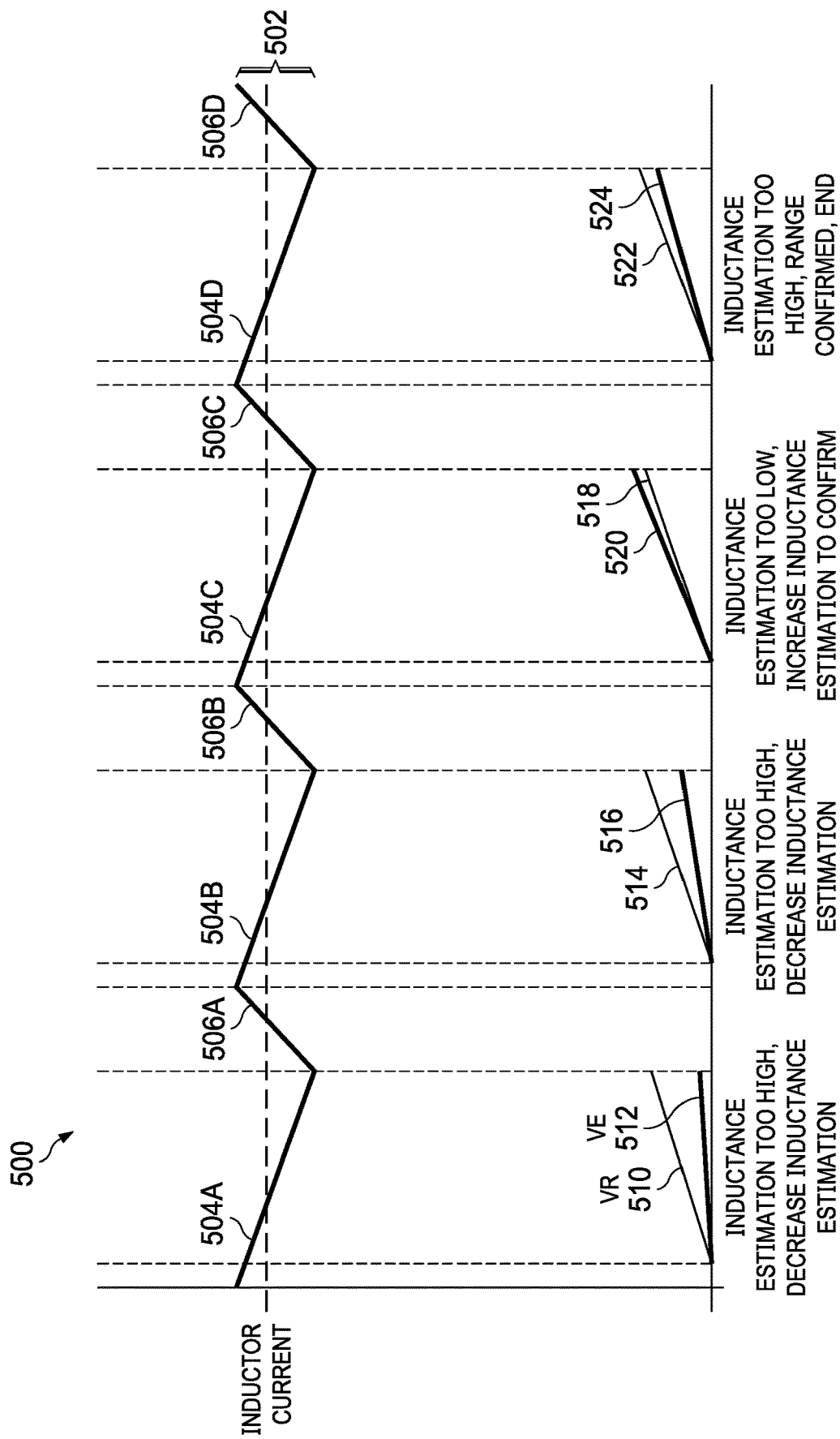
FIG. 5 is a graph showing an output inductor estimation scenario related to the output inductor estimator circuit of FIG. 4 in accordance with various examples.

FIG. 5 is a graph 500 showing an output inductor estimation scenario related to the output inductor estimator circuit 400 of FIG. 4 in accordance with various examples. In the example of FIG. 4 a low-side sensing scenario is presented, where sensing operations (related to slopes 510-524) are performed during falling slopes 504A-504D of the inductor current 502. For a high-side sensing scenario, the slopes related to the sensing operations would be inverted relative to the slopes 510-524, and the sensing operations would be performed during the rising slopes of the inductor current 502. In different examples, the rising and falling slopes of the inductor current 502 vary with regard to slope value and duration.

In graph 500, inductor current 502 (the current through L_OUT) is represented over time as rising slopes 504A-504D and falling slopes 506A-506D. During a first inductance estimation interval corresponding to the rising slope 504A, the operations of an output inductor estimation circuit (e.g., the output inductor estimator circuit 400) determine that the slope of a VE waveform 512 is less than the slope of a VR waveform 510, which indicates that the inductance of L_OUT is smaller than the inductance estimate (e.g., K is too low). Thus, K (inversely proportional to the estimated value of L_OUT) is increased in response to the comparison results of the VR waveform 510 with the VE waveform 512. During a subsequent inductance estimation interval corresponding to the rising slope 504B, the operations of an output inductor estimator circuit (e.g., the output inductor estimator circuit 400) determine that the slope of a VE waveform 516 is still less than the slope of a VR waveform 514, which indicates that the inductance of L_OUT is smaller than the inductance estimate (e.g., K is too low). Thus, K (inversely proportional to the estimated value of L_OUT) is increased and another inductance estimation iteration is performed.

During a subsequent inductance estimation interval corresponding to the rising slope 504C, the operations of an output inductor estimator circuit (e.g., the output inductance estimator circuit 400) determine that the slope of a VE waveform 520 is greater than the slope of a VR waveform 518, which indicates that the inductance of L_OUT is greater than the inductance estimate (e.g., K is too high). Thus, K (inversely proportional to the estimated value of L_OUT) is increased and another inductance estimation iteration is performed. During a subsequent inductance estimation interval corresponding to the rising slope 504D, the operations of an output inductor estimator circuit (e.g., the output inductor estimator circuit 400) determine that the slope of a VE waveform 524 is less than the slope of a VR waveform 522, which indicates that the inductance of L_OUT is smaller than the inductance estimate (e.g., K is too low). In this manner, a range for the inductance estimation parameter (K) is determined. Based on the inductance estimation operations performed in the intervals corresponding to the rising slopes 504A-504D, the value of the estimated inductance is matched to the inductance of L_OUT to within a desired threshold. In different examples, the accuracy level used to "match" the estimated inductance with the inductance of L_OUT may vary (greater or fewer inductance estimation iterations are used depending the desired accuracy level). In different examples, the estimated inductance may be used to adjust feedback loop compensation for a switching converter, to enable or disable a switching converter, to provide an indication to a user or designer that L_OUT is outside of a desired range, and/or other uses.

Figure 6:
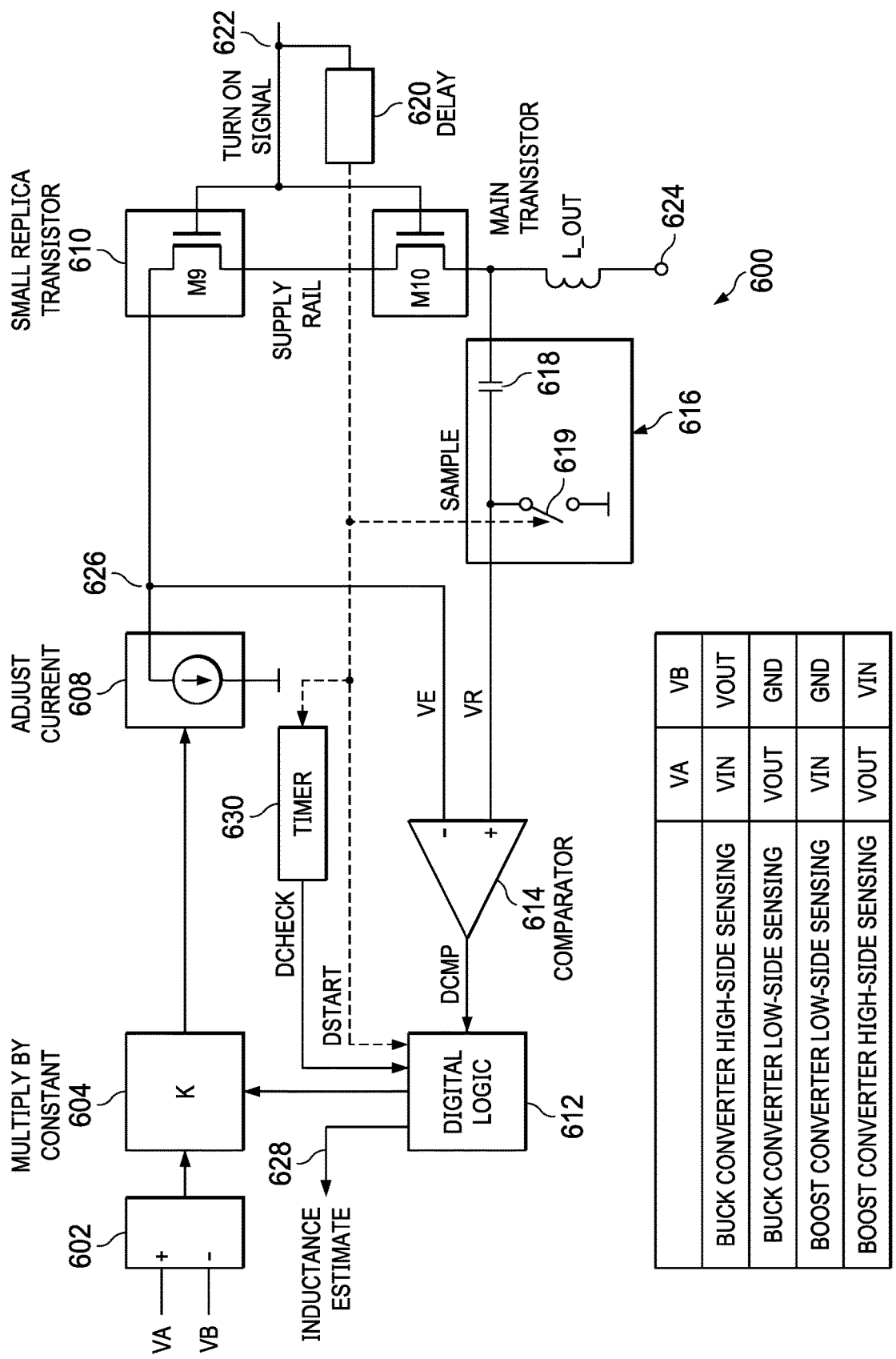
FIG. 6 is a schematic diagram showing another output inductor estimator circuit in accordance with various examples.

FIG. 6 is a schematic diagram showing another output inductor estimator circuit 600 in accordance with various examples. One advantage of this approach is that high speed amplifiers are not required for inductance estimation (e.g., only one high speed comparator is used). The output inductor estimator circuit 600 in FIG. 6 is an example of the output inductor estimator circuit 106 in FIG. 1, the output inductor estimator circuit 106A in FIG. 2, or the adaptive compensation circuit 106B in FIG. 3. In operation, the output inductor estimator circuit 600 provides an estimated inductance or related signal to node 628 (e.g., coupled to the ramp circuit 205 of FIG. 2, the variable resistor 208 of FIG.

2, an enable/disable component, and/or an alert component), where the inductance estimate or related signal is used to adjust an inductance estimation parameter (K) for a multiplication circuit 604.

In the example of FIG. 6, the value of K used by the multiplication circuit 604 is applied to a value (VA−VB) received from a subtraction circuit 602, such that the output of the multiplication circuit is K*(VA−VB). As shown, in a buck converter high-side sensing scenario, VA−VB is VIN−VOUT. In a buck converter low-side sensing scenario, VA−VB is VOUT−GND. In a boost converter low-side sensing scenario, VA−VB is VIN−GND. In a boost converter high-side sensing scenario, VA−VB is VOUT−VIN. In FIG. 6, the output of the multiplication circuit 604 is used to control a current source 608 coupled to a node 626. As shown, the node 626 provides an error value (VE) as an input to a comparator 614, where VE in FIG. 6 is single sampled value rather than a ramp as in FIG. 4. In some examples, the value of VE is given as: Iref*K(VA−VB). The other input to the comparator 614 is a voltage ramp waveform (VR), which is representative of the current going through L_OUT. In some examples, VR is given as: Ron ((VA−VB)*t/L), where t is the time elapsed in the timer 630. In the example of FIG. 6, Iref is a constant reference source, and K is a constant controlled by the digital logic 612. Also, n is the scaling between M9 and M10, where M10 is larger than M9.

In FIG. 6, VE is a function of M9. More specifically, VE is a function of the current source 608 and the resistance of M9. In some examples, M9 is a scaled replica of M10, and M10 is either the high-side switch or the low-side switch for a switching converter. As shown, the control terminal of M9 is coupled to node 622, the first current terminal of M9 is coupled to the node 626 (and the current source 608), and the second current terminal of M9 is coupled to the first current terminal of M10. The control terminal of M10 is also coupled to node 622, and the second current terminal of M10 is coupled to the first end of L_OUT (L_OUT is between a second current terminal of M10 and node 624 in the example of FIG. 6). Thus, when M9 and M10 are turned on, the voltage at the node 626 is a DC voltage estimate of the voltage of VR once the timer 630 expires.

In operation, the output inductor estimator circuit 600 is configured to estimate the inductance of L_OUT by comparing how the voltage at the first end of L_OUT changes over a time interval determined by a timer circuit 630. In the example of FIG. 6, VR=Ron ($I_{init}$+(VA−VB)*t/L) and $I_{L\_OUT}$=$I_{init}$+(VA−VB)*t/L. More specifically, Ron is the resistance of M10 when it is on, t is the amount of time after which the timer 630 issues an "on" signal, and L is the inductance of L_OUT. If we make Iref=1/n (where n is the ratio of M9 over M10), the result is: VE−VR=Ron(VA−VB)(K−t/L). Accordingly, the process of induction estimation will minimize VE−VR. Ideally, VE−VR=0 at time t. In such case, 0=Ron(VA−VB)(K−t/L). Since VA, VB, and Ron are slow moving, the value may be treated as DC values. Therefore, (K−t/L)=0, resulting in K=t/L and L=t/K. Since t is known, K can be iterated to approximated to the value of L. As another option, K may be held constant and t can be iterated to approximate to the value of L. In the example of FIG. 6, the voltage at the first end of L_OUT is sampled in the capacitor 618 and VR=0, where the timing of the sampling circuit 616 is directed by the delay circuit 620. After that moment, VR will increment in the same way as the voltage at M10, which is provided to one of the inputs of a comparator 614. The other input to the comparator 614 is the value of VE at node 626. The comparator 614 compares the value of VE with the value of VR.

The output of the comparator 614 is provided to digital logic 612, which analyzes the comparator output (DCMP) at a time determined by a timer circuit 630. By obtaining and comparing VE and VR iteratively, where the comparison analysis of the digital logic 612 corresponds to a particular time determined by the timer circuit 630, the digital logic 612 determines when an estimated inductance is accurate with the inductance of L_OUT to within a threshold range. In response to detecting a "match" of the estimated inductance with the inductance of L_OUT to within a threshold range, the digital logic 612 output the estimated inductance or related signal to node 628. As needed, the digital logic 612 also adjusts K up or down for the multiplication circuit 604 or/and the timer 630 time. In the example of FIG. 6, the digital logic 612 also uses a DSTART signal from the delay circuit 620 and a DCHECK signal from a timer circuit 630 to determine which value of VR as a function of time will be compared to VE.

In some examples, the output inductor estimation circuit 600 performs the process of estimating the inductance of L_OUT by iteratively obtaining and comparing VR and VE until the difference between VR and VE is less a threshold and/or the difference does not change by more than a threshold amount (indicating that the value of K is accurate). As desired, in different examples, the estimated inductance or related signal is used to compensate for different L_OUT value (e.g., to adjust the ramp circuit 205 of FIG. 2, the variable resistor 208 of FIG. 2), to enable/disable a switching converter based on the estimated inductance being within a desired range or not, and/or to provide an alert signal to a user or designer based on the estimated inductance being within a desired range or nor). In some examples, the output inductor estimation circuit 600 lowers the sensitivity of a switching converter (e.g., the voltage mode DC-DC converter 102A in FIG. 2, or the voltage mode DC-DC converter 102B in FIG. 3) to variations in components such as L_OUT can be reduced by compensation based on the estimated inductance. Thus, instead of being limited to a tight range of L_OUT values and/or instead of using programmable external components, a switching converter is compatible with a wide range of L_OUT values.

Figure 7:
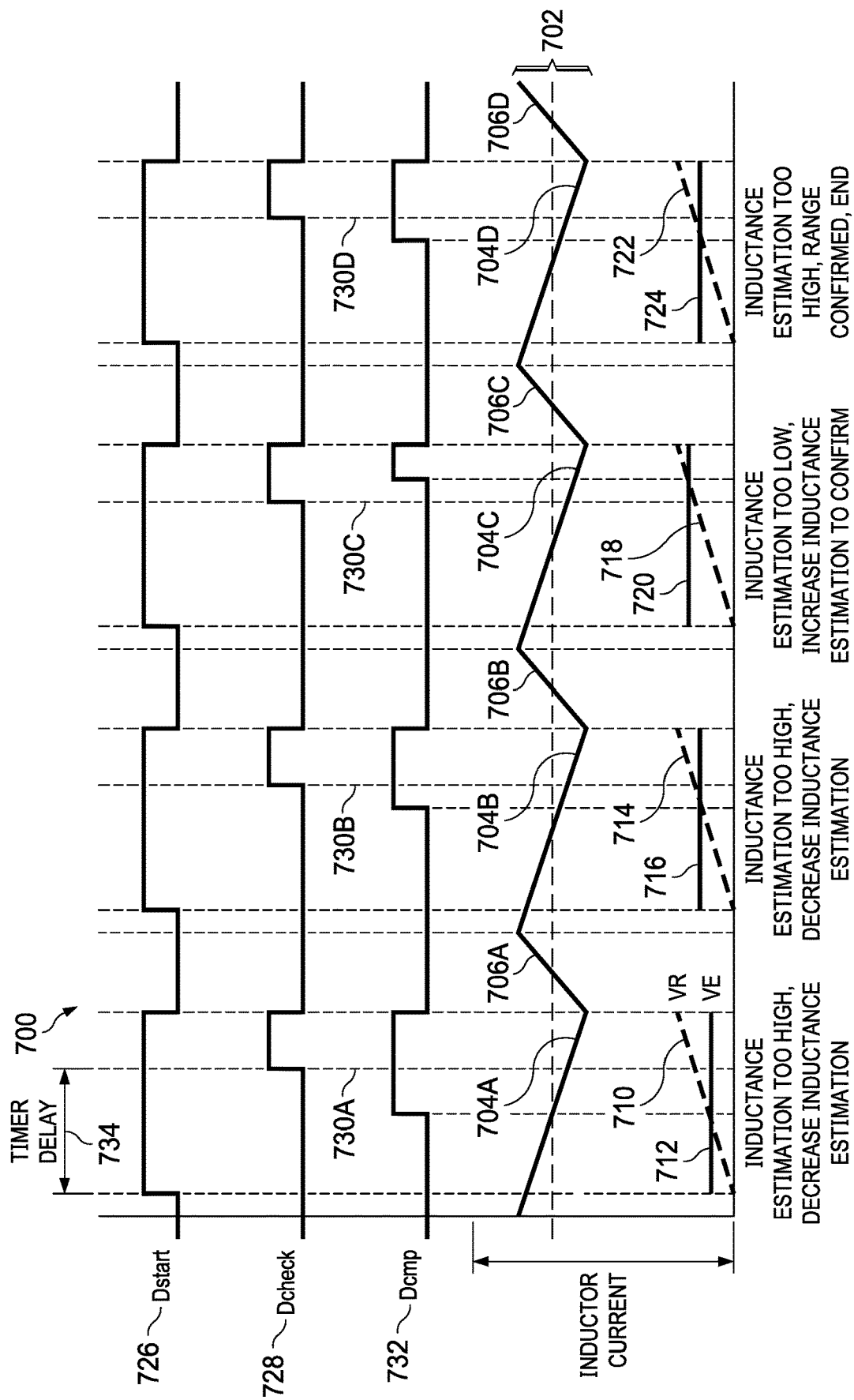
FIG. 7 is a graph showing an output inductor estimation scenario related to the output inductor estimator circuit of FIG. 6 in accordance with various examples.

FIG. 7 is a graph 700 showing an output inductor estimation scenario related to the output inductor estimator circuit 600 of FIG. 6 and low-side sensing in accordance with various examples, where sensing operations (related to slopes 710, 714, 718, 722 and values 712, 716, 720, and 724) are performed during falling slopes 704A-704D of the inductor current 702. For a high-side sensing scenario, the slopes related to the sensing operations would be inverted relative to the slopes 710, 714, 718, and 722, and the sensing operations would be performed during the rising slopes of the inductor current 702. In different examples, the rising and falling slopes of the inductor current 702 vary with regard to slope value and duration.

In a high-side sensing scenario, the slopes 704 and 706 are inverted). In graph 700, inductor current 702 (the current through L_OUT) is represented over time as rising slopes 704A-704D and falling slopes 706A-706D. Also, various waveforms that are used in the inductance estimation process of graph 700 are represented, where the various waveforms include a Dstart waveform 726, a Dcheck waveform 728, and a Dcmp waveform 732. Relating FIG. 7 to FIG. 6, the Dstart waveform 726 is an example of the Dstart signal provided by the delay circuit 620 to the timer 630 and to the digital logic 612. Also, the Dcheck waveform 728 is an example of the Dcheck signal provided by the timer 630 to the digital logic 612. As shown, rising edges of the Dcheck waveform 728 are delayed relative to rising edges of the Dstart waveform 726 based on a time delay value 734. Also, the Dcmp waveform 732 is an example of the Dcmp signal provided by the comparator 614 to the digital logic 612.

During a first inductance estimation interval corresponding to the rising slope 704A, the operations of an output inductor estimator circuit (e.g., the output inductor estimator circuit 600) determine that a VE value 712 is less than a value of a VR waveform 510 at time 730A (corresponding to a first rising edge of the Dcheck waveform 728), which indicates that the inductance of L_OUT is smaller than the inductance estimate (e.g., K is too low). Thus, K (inversely proportional to the value of L_OUT) is increased and another inductance estimation iteration is performed.

During a subsequent inductance estimation interval corresponding to the rising slope 704B, the operations of an output inductor estimator circuit (e.g., the output inductor estimator circuit 600) determine that a VE value 716 is still less than the value of a VR waveform 714 at time 730B (corresponding to a second rising edge of the Dcheck waveform 728), which indicates that the inductance of L_OUT is smaller than the inductance estimate (e.g., K is too low). Thus, K (inversely proportional to the value of L_OUT) is increased and another inductance estimation iteration is performed.

During a subsequent inductance estimation interval corresponding to the rising slope 704C, the operations of an output inductor estimator circuit (e.g., the output inductance estimator circuit 400) determine that a VE value 720 is greater than the value of a VR waveform 518 at time 730C (corresponding to a third rising edge of the Dcheck waveform 728), which indicates that the inductance of L_OUT is more than the inductance estimate (e.g., K is too high). Thus, K (inversely proportional to the value of L_OUT) is decreased and another inductance estimation iteration is performed. During a subsequent inductance estimation interval corresponding to the rising slope 704D, the operations of an output inductor estimator circuit (e.g., the output inductor estimator circuit 600) determine that a VE value 724 is less than the value of a VR waveform 722 at time 730D (corresponding to a fourth rising edge of the Dcheck waveform 728), which indicates that the inductance of L_OUT is smaller than the inductance estimate (e.g., K is too low). In this manner, a range for the inductance estimation parameter (K) is determined. Based on the inductance estimation operations performed in the intervals corresponding to the rising slopes 704A-704D, the value of the estimated inductance is matched to the inductance of L_OUT to within a desired threshold. In different examples, the accuracy level used to "match" the estimated inductance with the inductance of L_OUT may vary (greater or fewer inductance estimation iterations are used depending the desired accuracy level). In different examples, the estimated inductance may be used to adjust feedback loop compensation for a switching converter, to enable or disable a switching converter, to provide an indication to a user or designer that L_OUT is outside of a desired range, and/or other uses.

Figure 8:
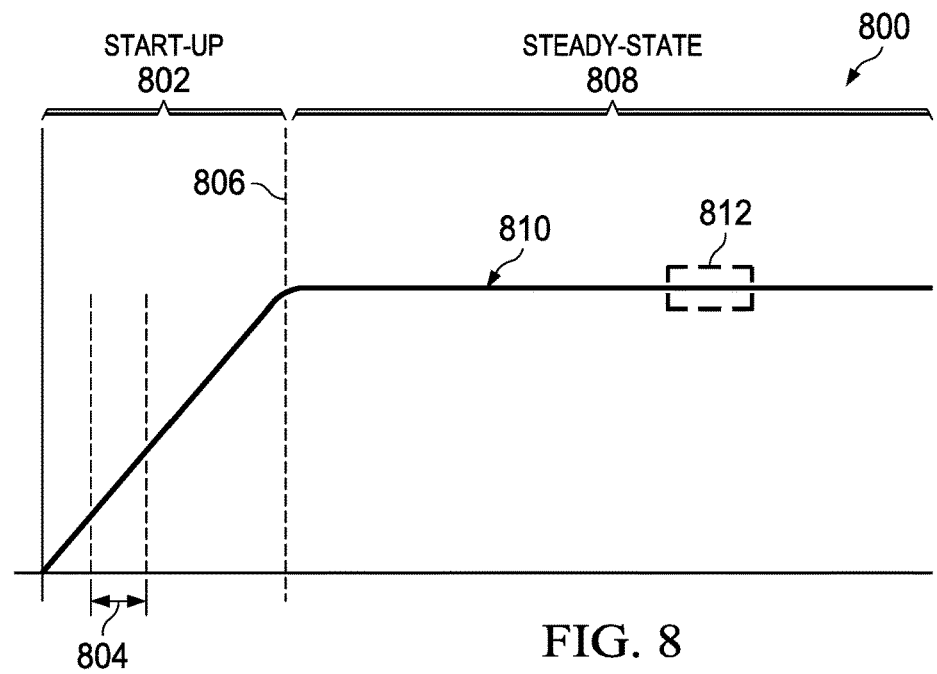
FIG. 8 is a graph showing output inductor estimation timing scenarios for a voltage mode converter in accordance with various examples.

FIG. 8 is a graph 800 showing output inductor estimation timing scenarios for a voltage mode converter in accordance with various examples. In graph 800, a VOUT waveform 810 is represented relative to a start-up interval 802 and a steady-state interval 808, where line 806 is where the start-up interval 802 transitions to the steady-state interval 808. In some examples, the inductance estimation and response operations described herein are performed during a period 804 of the start-up interval 802. Additionally or alternatively, the inductance estimation and response operations described herein are performed during a period 812 of the steady-state interval 808. The inductance estimation can be performed at any time without disturbing normal operation during start-up and steady-state.

In some examples, an output inductor estimator circuit (e.g., the output inductor estimator circuit 400 in FIG. 4 or the output inductor estimator circuit 600 in FIG. 6) is configured to perform inductance estimation operations using high-side sensing during a start-up interval and/or steady-state interval for a switching converter (e.g., an AC-DC converter, a DC-DC current mode buck converter, a DC-DC current mode buck converter, a DC-DC voltage mode buck converter, or a DC-DC voltage mode boost converter). Thereafter, compensation for a feedback control loop and/or other operations are performed based on the estimated inductance. In some examples, an output inductor estimator circuit (e.g., the output inductor estimator circuit 400 in FIG. 4 or the output inductor estimator circuit 600 in FIG. 6) is configured to perform inductance estimation operations using low-side sensing during a start-up interval and/or steady-state interval for a switching converter (e.g., an AC-DC converter, a DC-DC current mode buck converter, a DC-DC current mode buck converter, a DC-DC voltage mode buck converter, or a DC-DC voltage mode boost converter). Thereafter, compensation for a feedback control loop and/or other operations are performed based on the estimated inductance.

Figure 9:
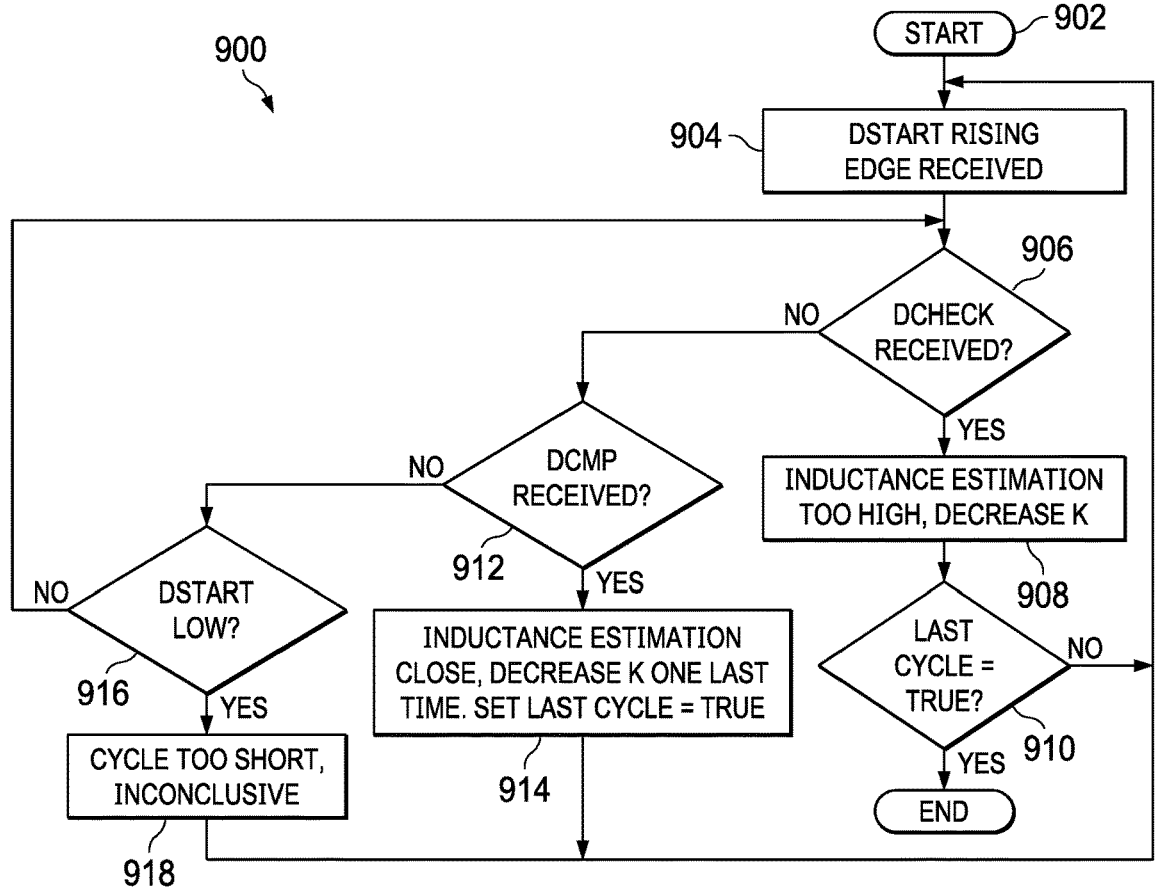
FIG. 9 is a flow chart showing an output inductor estimation method in accordance with various examples.

FIG. 9 is a flowchart showing an inductance estimation method 900 in accordance with various examples. In some examples, the inductance estimation method 900 is performed by digital logic (e.g., the digital logic 612 of FIG. 6) of an output inductor estimator circuit (e.g., the output inductor estimator circuit 600 of FIG. 6). As shown, the method 900 starts at block 902 and proceeds to receiving the rising edge of a DSTART signal (e.g., a control signal provided by the delay circuit 620 in FIG. 6) at block 904. If a DCHECK signal is not received (determination block 906), if a DCMP signal is not received (determination block 912, and if a DSTART signal is low (determination block 916), the method 900 returns to determination block 906. In some examples, the DCHECK signal is provided by a timer 630 in communication with the delay circuit 620, the DCMP signal is provided by the comparator 614, and the DSTART signal is provided by the delay circuit 620.

If the DSTART signal is low (determination block 916), the cycle is too short and inconclusive (block 918) and the method 900 returns to block 904. If the DCMP signal is received (determination block 912), K is reduced and a LAST CYCLE flag is set to true at block 914 because the inductance estimation is assumed to be close. If the DCHECK signal is received (determination block 906), the inductance estimation is too high, and K is increased at block 908. If the LAST CYCLE is set to true (determination block 910), the method 900 ends. Otherwise, the method 900 returns to block 904. With the method 900, the inductance of an output inductor (e.g., L_OUT) is estimated using an iterative process that uses the change in voltage at one end of the output inductor as a function of time to determine if an estimated inductance matches the L_OUT value. As needed, the estimated inductance is adjusted up or down, and the process of testing the accuracy of the estimated inductance is performed. Once the estimated inductance is determined to be accurate to within a threshold range, compensation of a voltage feedback control loop is performed based on the estimated inductance as described herein or an alternative action such as an alarm flag, shutdown protection, etc.

Certain terms have been used throughout this description and claims to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ." The recitation "based on" is intended to mean "based at least in part on." Therefore, if X is based on Y, X may be a function of Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An automotive system, comprising:
a battery;
a switching converter circuit with an input supply voltage node, a high-side switch, a low-side switch, a switch node between the high-side switch and the low-side switch, a driver for the high-side switch and the low-side switch, wherein the input node of the switching converter circuit is coupled to the battery;
an output inductor with a first end and a second end, wherein the first end of the output inductor is coupled to the switch node of the switching converter circuit;
an output capacitor with a first terminal and a second terminal, wherein the first terminal of the output capacitor is coupled to the second end of the output inductor, and wherein the second terminal of the output capacitor is coupled to a ground node;
a load coupled to the second end of the output inductor, wherein the switching converter circuit comprises an output inductor estimator circuit coupled to the driver and the switch node, wherein the output inductor estimator circuit is configured to estimate inductance for the output inductor based on a comparison of sampled voltages from the switch node with voltage error values obtained using an adjustable estimated inductance parameter, and wherein the output inductor estimator circuit is configured to provide a signal indicating the estimated inductance for the output inductor.

2. The system of claim 1, wherein the switching converter circuit further comprises:
a voltage feedback control loop between the second end of the output inductor and the driver; and
a compensation circuit coupled to at least one component of the voltage feedback control loop and to the switch node, wherein the output inductor estimator circuit is configured to adjust at least one component of the compensation circuit based on the signal indicating the estimated inductance for the output inductor.

3. The system of claim 1, wherein the output inductor estimator circuit is configured to enable or disable the switching converter circuit based on the signal indicating the estimated inductance for the output inductor.

4. The system of claim 1, wherein the output inductor estimator circuit is configured to provide an alert based on the signal indicating the estimated inductance for the output inductor.

5. The system of claim 2, wherein voltage feedback control loop comprises a comparator with a first input and a second input, wherein the compensation circuit is configured to adjust at least one of a first value input to the first input and a second value input to the second input based on the signal indicating the estimated inductance for the output inductor.

6. The system of claim 2, wherein the output inductor estimator circuit is configured to iteratively increase the adjustable estimated inductance parameter until detecting that a value of the adjustable estimated inductance parameter results in a match between the sampled voltages and the voltage error values to within a threshold range.

7. The system of claim 2, wherein the output inductor estimator circuit is configured to iteratively decrease the adjustable estimated inductance parameter until detecting that a value of the adjustable estimated inductance parameter results in a match between the sampled voltages and the voltage error values to within a threshold range.

8. The system of claim 1, wherein the output inductor estimator circuit comprises:
a comparator configured to iteratively compare sampled voltage ramps with different voltage error ramps or values; and
digital logic coupled to the comparator and configured to use comparison results of the comparator to determine the estimated inductance for the output inductor.

9. The system of claim 2, wherein the output inductor estimator circuit is configured to determine the estimate inductance during a start-up interval for the switching converter circuit.

10. The system of claim 2, wherein the output inductor estimator circuit is configured to determine the estimate inductance during a steady-state regulation interval for the switching converter circuit.

11. A switching converter device, comprising:
a switch set having at least one switch and a switch node;
a driver coupled to the at least one switch;
an output inductor estimator circuit coupled to the driver and the switch node, wherein the output inductor estimator circuit is configured to estimate inductance of an output inductor associated with the converter device based on a comparison of sampled voltages from the switch node with voltage error values obtained using an adjustable estimated inductance parameter, and wherein the output inductor estimator circuit is configured to provide a signal indicating the estimated inductance for the output inductor.

12. The switching converter device of claim 11, further comprising a feedback loop between the driver and the switch node, wherein the feedback loop includes a compensation circuit, and wherein at least one component of the compensation circuit is adjusted based on the signal indicating the estimated inductance for the output inductor.

13. The switching converter device of claim 11, wherein the output inductor estimator circuit comprises:
a comparator configured to iteratively compare the sampled voltages with different voltage error values; and
digital logic coupled to the comparator and configured to use comparison results of the comparator to determine the estimated inductance for the output inductor.

14. The switching converter device of claim 13, wherein the output inductor estimator circuit further comprises:
a subtract circuit;
a multiplication circuit coupled to the subtract circuit;
an integrator coupled to the multiplication circuit; and
a current source coupled to the integrator, wherein each of the voltage error values is a function of the current source.

15. The switching converter device of claim 11, wherein the output inductor estimator circuit comprises:
a timer configured to provide a timing value;
a comparator configured to iteratively compare the sampled voltages with different voltage error values at timing values determined by the timer; and
digital logic configured to use comparison results of the comparator to determine the estimated inductance for the output inductor.

16. An inductor estimator circuit, comprising:
a sampling circuit coupled to a switch node for a switching converter;
a comparator with a voltage error input node and a sampled voltage ramp input node, wherein the sampled voltage ramp input node is coupled to an output node of the sampling circuit;
a current source coupled to the voltage error input node,
a multiplier coupled to the current source; and
digital logic with an input node coupled to an output node of the comparator and with an output node coupled to an input node of the multiplier.

17. The inductor estimator circuit of claim 16, further comprising an integrator between the multiplier and the current sink, wherein the voltage error input node of the comparator receives different voltage error ramps for each iteration of an inductance estimation process.

18. The inductor estimator circuit of claim 16, further comprising a timer coupled to the digital logic and configured to provide a time value to the digital logic, and wherein the digital logic is configured to estimate inductance for an output inductor based on compare results of the comparator that are associated with the time value provided by the timer.

19. An inductor estimator circuit, comprising:
a first circuit configured to sample voltage at a switch node for a switching converter;
a second circuit coupled to the first circuit, wherein the second circuit is configured to compare voltage error values with sampled voltage values provided by the sample first circuit; and
a third circuit coupled to the second circuit and configured to use iterative outputs of the second circuit to determine an estimated inductance for an output inductor associated with the switching converter.

20. The inductor estimator circuit of claim 19, further comprising:
a fourth circuit coupled to the third circuit, wherein the fourth circuit is configured to multiply a voltage differential by an adjustable estimated inductance parameter;
a fifth circuit coupled to the fourth circuit, wherein the fifth circuit configured to adjust the voltage error values based on the adjustable estimated inductance parameter;
a sixth circuit coupled between the fourth circuit and the fifth circuit, wherein the second circuit is configured to receive different voltage error ramps for each iteration of an inductance estimation process.

21. The inductor estimator circuit of claim 20, further comprising a seventh circuit coupled to the third circuit and configured to provide a time value to the third circuit, and wherein the third circuit is configured to determine the estimated inductance for the output inductor based on compare results of the second circuit that are associated with the time value provided by the seventh circuit.

* * * * *